Patented June 17, 1930

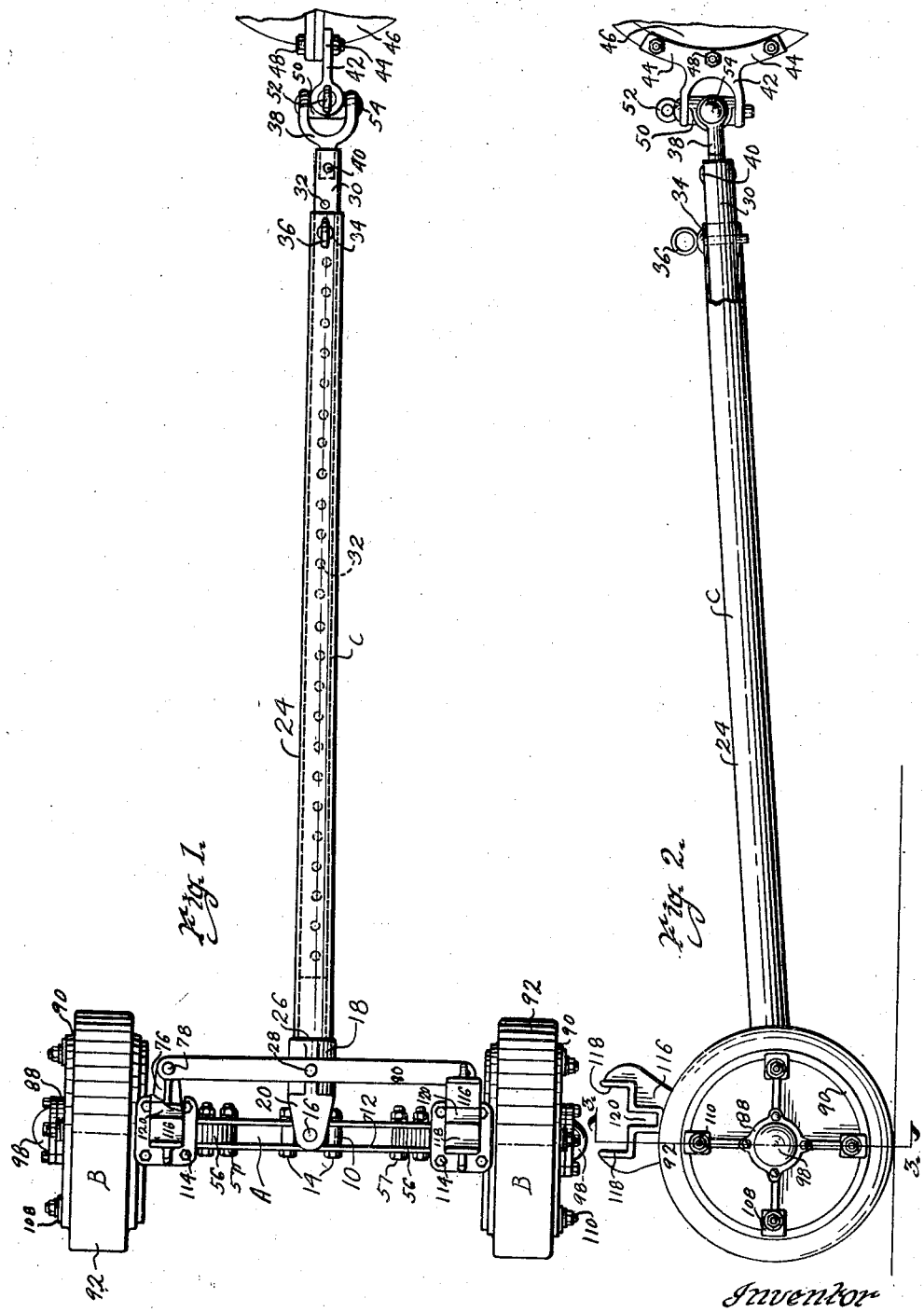

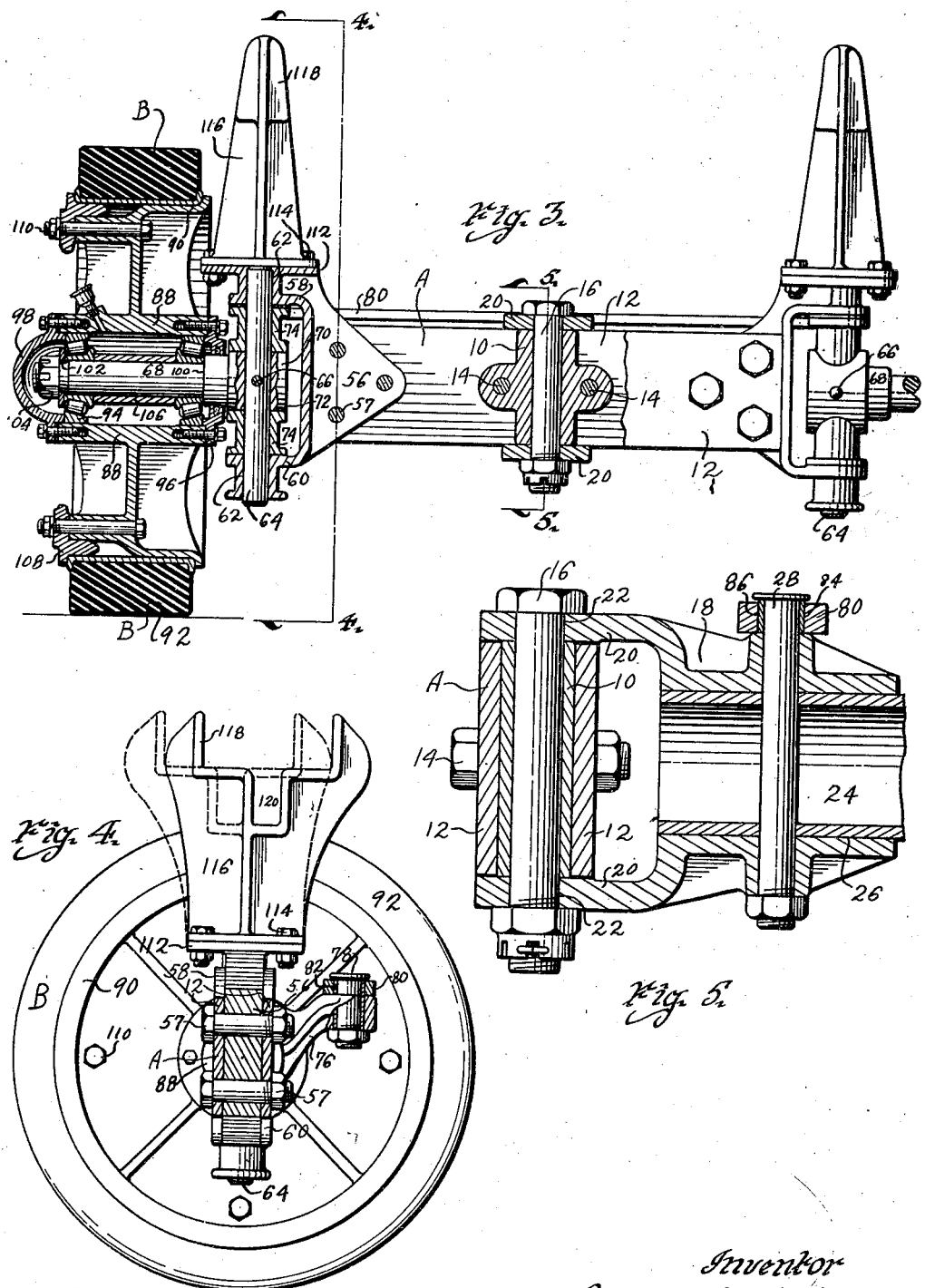

1,764,971

UNITED STATES PATENT OFFICE

LEONARD D. NILSON, OF WAYZATA, MINNESOTA, ASSIGNOR TO MARQUETTE MANUFACTURING COMPANY, OF ST. PAUL, MINNESOTA

TOWING DOLLY

Application filed July 16, 1928. Serial No. 293,157.

The object of my invention is to provide a towing dolly of simple, durable and inexpensive construction.

A further object is to provide a towing dolly in which steerable wheels are mounted on the ends of an axle, a tow pole being pivoted to the axle and operatively connected with the steerable wheels, whereby they are steered upon pivotal movement of the towing pole with relation to the axle.

Still a further object is to provide two points of connection with the axle of the automobile being towed, whereby the strains upon the towing dolly are better distributed and the weight is carried in a more practical manner than on a bolster type of towing dolly.

Still another object is to provide a pair of axle receiving members adapted to receive either the front or the rear axle of a disabled car, such receiving members being located adjacent the wheels of the dolly and being reversible, whereby the weight may be carried either ahead or back of the towing dolly axle.

With these and other objects in view, my invention consists in the construction, arrangement and combination of the various parts of my device, whereby the objects contemplated are attained, as hereinafter more fully set forth, pointed out in my claims, and illustrated in the accompanying drawings.

Although the invention is suceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a plan view of my device illustrating it connected with the rear axle of a service car.

Figure 2 is a side elevation of the same.

Figure 3 is an enlarged view taken on the indicated line 3—3 of Figure 2, illustrating parts of the dolly in section and other parts in rear elevation.

Figure 4 is a sectional view taken on the line 4—4 of Figure 3; and

Figure 5 is a sectional view taken on the line 5—5 of Figure 3.

In the accompanying drawings, I have used the reference character A to indicate generally the axle of a towing dolly. On the ends of the axle A, wheels B are mounted. A tow pole C is connected with the axle A for pulling the dolly behind a service car.

The axle A comprises a casting 10 and a pair of flat bars 12. The bars 12 are secured to the casting 10 by means of bolts 14. A pivot bolt 16 extends vertically through the casting 10.

A yoke 18 having a bifurcated end terminating in spaced arms 20 is pivotally mounted with respect to the axle A. Such pivotal mounting is provided for by the pivot bolt 16 extending through openings 22 formed in the arms 20 of the yoke 18.

A tubular tow pole member 24 extends into a socket 26 in the yoke 18 and is held therein by a bolt 28.

A second tubular tow pole member 30 extends telescopically into the member 24, whereby it may be adjusted relative thereto for adjusting the overall length of the tow pole C. Provision is made for the adjustment of the tow pole member 30 relative to the member 24 by means of a plurality of pairs of spaced openings 32 in the member 30 and a pair of openings 34 formed in the tow pole member 24. Any desired pair of openings 32 may be brought into register with the pair of openings 34 and a removable pin 36 inserted through the openings thus aligned for maintaining the longitudinal adjustment of the tow pole C.

The forward end of the tow pole member 30 has received therein a yoke 38. The yoke 38 may be secured to the member 30 by means of a rivet 40.

A second yoke 42 having a pair of attaching arms 44 is secured to the rear axle housing 46 of the service car or the car towing the disabled car. The arms 44 of the yoke 42 may be fastened to the housing 46 by the bolts 48, which ordinarily hold the two halves of the differential housing together.

A bearing block 50 is mounted between the yokes 38 and 42 and is provided with a vertical pivot pin 52 and a horizontal pivot pin 54. The yokes 38 and 42 receive the ends of the pivot pins 54 and 52 respectively, whereby a universal connection is had between the tow pole C and the axle housing 46 on the service car.

Although I have shown one type of connection for the tow pole to the service car, it will be obvious that other types might also be provided, whereby the towing dolly may be satisfactorily pulled behind the service car.

On each end of the axle A, a yoke member 56 is secured by means of bolts 57. The yoke member 56 is provided with an upper arm 58 and a lower arm 60, both of which are provided with vertically aligned openings 62. A spindle pin 64 is rotatably mounted in the openings 62 of the arms 58 and 60.

Secured to the spindle pin 64 by means of a pin 66 is a spindle 68. The spindle 68 has an enlarged portion 70 extending through the bore 72 of a spindle member 74. The spindle member 74 serves to position the spindle 68 and the spindle pin 64 with respect to the arms 58 and 60 of the yoke member 56.

Each spindle member 74 is provided with a steering arm 76. A bolt 78 is mounted in each arm 76 and the ends of a link 80 are pivotally mounted on bushings 82 on the bolts 78. At the center of the link 80 a bore 84 is formed to receive a bushing 86. The bushing 86 is mounted on the bolt 28 of the tow pole C.

Each supporting wheel B consists of a hub 88, a rim 90 and a tire 92. Within the hub 88, roller bearings 94 of the thrust type are mounted. The outer races of the bearings 94 contact with an end plate 96 bolted to the inner end of the hub 88 and with a hub cap 98 bolted to the outer end of the hub 88.

The inner races of the bearings 94 bear against a shoulder 100 formed on the spindle 68 and against a washer 102 held in position with respect to the spindle 68 by a nut 104. A sleeve 106 is interposed between the two inner races of the bearings.

The tires 92 are of the ordinary solid rubber construction and may be held in position by means of rim lugs 108 and lug bolts 110. If desired, pneumatic tires can be substituted for the solid rubber tires 92.

The arms 58 of the yoke members 56 terminate in horizontally arranged supporting plates 112. Bolted by means of the bolts 114 to the supporting plates 112 are axle receiving members 116. Each axle receiving member 116 is in the shape of a yoke having a pair of spaced arms 118 and a depression 120. The front axle of a disabled car may be positioned in the depression 120 or the rear axle housing amy be positioned between the arms 118 of the axle receiving member 116 depending on whether the front wheels or the rear wheels of the car are disabled. In the event that the rear axle is provided with truss rods, such rods will be received in the depressions 120.

It will be noted that the arms 118 and the depressions 120 are off-center with respect to the spindle pins 64 and consequently the axle A. Therefore the load of the disabled car may be carried ahead of the axle as shown in Figure 4 by the full line position of the axle receiving member 116.

In some cases, it is desirable to carry the load back of the axle A, and in such an event the axle receiving members 116 may be unbolted from the supporting plate 112 and thereafter rebolted to the plate in reverse position, as shown in dotted lines.

*Practical operation*

In the operation of my device, the yoke member 42 is secured to a service car. The towing dolly may be carried in the bed of the car by merely removing the pin 52 from the universal joint connection between the service car and the towing dolly.

When the service car has been brought into position with respect to the disabled car, the towing dolly may be inserted beneath either the front or rear axle of the disabled car, after such axle has been jacked up. The towing dolly may then be connected with the service car by reinserting the removable pin 52 in the bearing member 50. In order to do this, the pin 36 may be left out of the tow pole C and the tow pole may then be adjusted as to length depending on whether or not a short or a long tow pole is desired.

The weight of the disabled car is carried very close to the supporting wheels B, which considerably lessens the strain caused by such weight on the axle A. The axle A may therefore be comparatively light in construction, whereby the entire dolly is somewhat lightened in weight.

I have overcome the objectionable construction of towing dollies wherein the axle pivots with relation to the disabled car. This is accomplished by the tow pole C being pivoted with respect to the axle A, whereupon the service car turning a corner will swing the tow pole. Such swinging movement is transmitted to the steering arms 76 of the spindle members 74 for the purpose of swinging the spindles 68 and thereby steering the wheels B.

Some changes may be made in the arrangement and construction of the various parts of my towing dolly, without departing from the real spirit and purpose of my invention, and it is my intention to cover by my claims, any modified forms of structure or use of mechanical equivalents, which may be reasonably included within their scope.

I claim as my invention:

1. A towing dolly comprising an axle member formed of two flat bars, yoke members secured between said bars at each end of said axle member, steerable wheels carried by said yoke members, a filler member secured between said bars at the center thereof, a tow pole pivoted to said filler member, means on said dolly for causing steering movement of said wheels upon pivotal movement of said tow pole, and axle receiving members mounted on said yoke members adjacent said steerable wheels.

2. In a towing dolly, an axle member, a tow pole pivoted to the center thereof, a yoke member secured to each end of said axle member, a spindle member oscillatably mounted in each of said yoke members, a wheel and a steering arm on each spindle member, an axle receiving member on each end of said axle member and carried by said yoke members and steering connection means between said steering arms and said tow pole.

3. In a device of the character disclosed, an axle member, a tow pole pivoted thereto, yoke members secured to the ends of said axle member, spindle members pivotally mounted in said yoke members, wheels on said spindle members, axle receiving members secured to said yoke members, and operative means of connection between said tow pole and said spindle members.

4. In a towing dolly, an axle member comprising a pair of bars, a tow pole pivoted to the center thereof, a spindle mounting secured between said bars at each end of said axle member, a spindle oscillatable within each spindle mounting, a wheel and a steering arm on each spindle and an axle receiving member on each of said spindle mountings and located above the oscillatably mounted spindle.

5. In a device of the character disclosed, an axle member, a tow pole pivoted thereto, spindle mountings secured to the ends of said axle member, spindle members pivotally mounted in said spindle mountings, wheels on said spindle members, axle receiving members secured to said spindle mountings, and operative means of connection between said tow pole and said spindle members.

Des Moines, Iowa, June 27, 1928.

LEONARD D. NILSON.